(12) United States Patent
Tsubaki

(10) Patent No.: US 9,674,441 B2
(45) Date of Patent: Jun. 6, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 14/814,761

(22) Filed: Jul. 31, 2015

(65) Prior Publication Data

US 2016/0044245 A1    Feb. 11, 2016

(30) Foreign Application Priority Data

Aug. 5, 2014 (JP) ................................. 2014-159766

(51) Int. Cl.
*H04N 5/232* (2006.01)

(52) U.S. Cl.
CPC ..... *H04N 5/23267* (2013.01); *H04N 5/23258* (2013.01); *H04N 5/23287* (2013.01)

(58) Field of Classification Search
CPC ........... H04N 5/23229; H04N 5/23264; H04N 5/23267; H04N 5/23287
See application file for complete search history.

(56) References Cited

U.S. PATENT DOCUMENTS

| 8,290,356 B2 * | 10/2012 | Imamura | G03B 5/02 348/208.11 |
| 2005/0259888 A1 * | 11/2005 | Ozluturk | H04N 5/23248 382/260 |
| 2015/0002684 A1 * | 1/2015 | Kuchiki | H04N 5/23232 348/208.4 |
| 2015/0043786 A1 * | 2/2015 | Ohki | H04N 5/23254 382/107 |

FOREIGN PATENT DOCUMENTS

| JP | 08-211088 A | 8/1996 |
| JP | 11-190816 A | 7/1999 |

(Continued)

OTHER PUBLICATIONS

Rabinovich et al., "Objects in context", in Proc. of IEEE International Conference on Computer Vision (2007) 8 pgs Cited in Specification in paragraph [0029].

(Continued)

*Primary Examiner* — Daniel M Pasiewicz
(74) *Attorney, Agent, or Firm* — Cowan, Liebowitz & Latman, P.C.

(57) ABSTRACT

An image processing apparatus comprises a detection unit configured to detect a main subject from an image captured by an image sensor that captures a subject image, a position detection unit configured to detect a position, on a screen, of the main subject, and a correction unit configured to correct, based on the position of the main subject detected by the detection unit, at least one of a blur and a distortion of an image of a subject other than the main subject, the blur and (Continued)

the distortion occurring due to correction of a blur of an image of the main subject performed by an optical image stabilization unit configured to optically correct a blur, on the screen, of the image of the main subject.

11 Claims, 11 Drawing Sheets

(56) References Cited

FOREIGN PATENT DOCUMENTS

| | | |
|---|---|---|
| JP | 2000-207564 A | 7/2000 |
| JP | 2007-096437 A | 4/2007 |
| JP | 2007-215114 A | 8/2007 |
| JP | 2012-014196 A | 1/2012 |
| JP | 2012-217102 A | 11/2012 |
| JP | 2014-150443 A | 8/2014 |
| JP | 2015-019231 A | 1/2015 |

OTHER PUBLICATIONS

Horn et al., "Comparison of Segmentation Approaches" Decision Analyst (2009) Cited in Specification in paragraph [0028].
Baker et al., "Removing Rolling Shutter Wobble", Proc. CVPR (2010) 8 pgs Cited in Specification in paragraph [0052].

\* cited by examiner

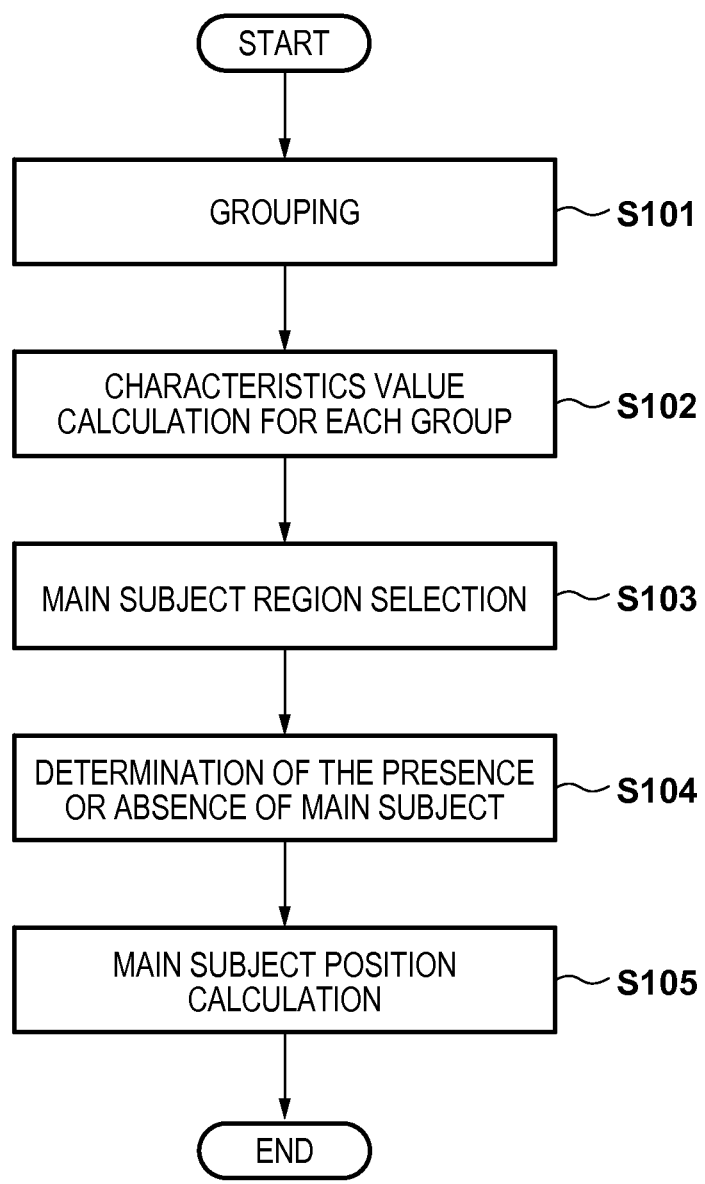

FIG. 3A
FIG. 3B
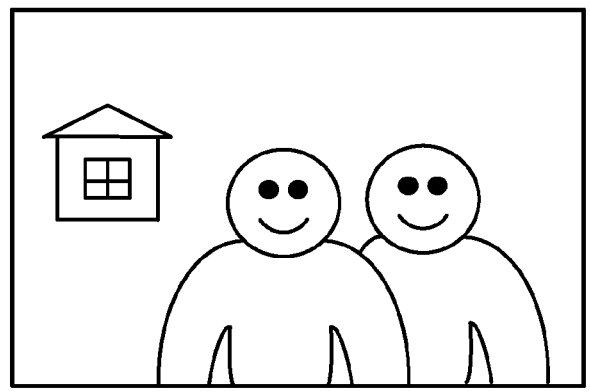
FIG. 3C
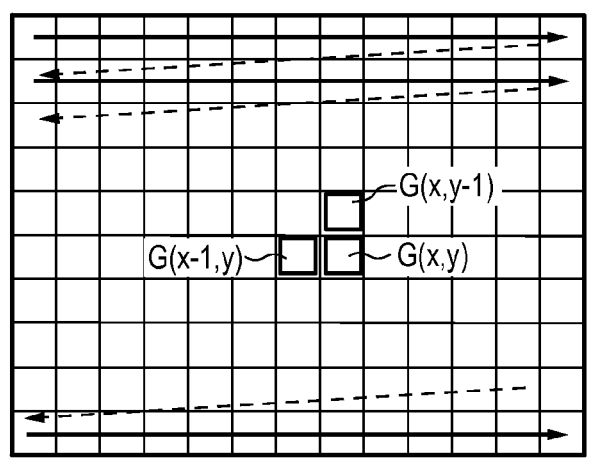

F I G. 4
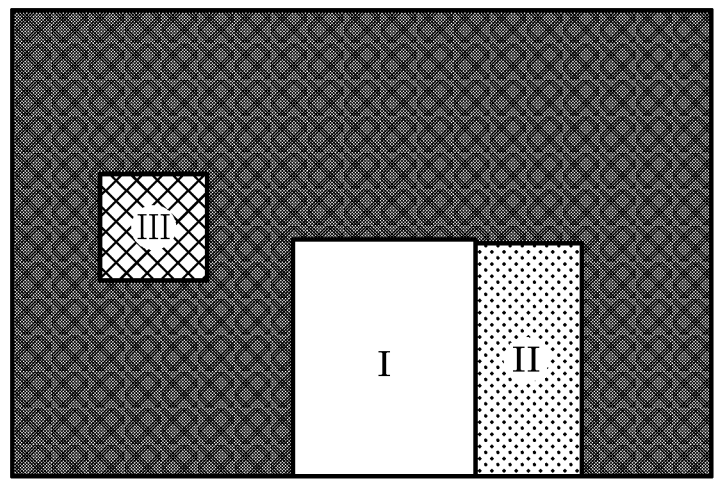

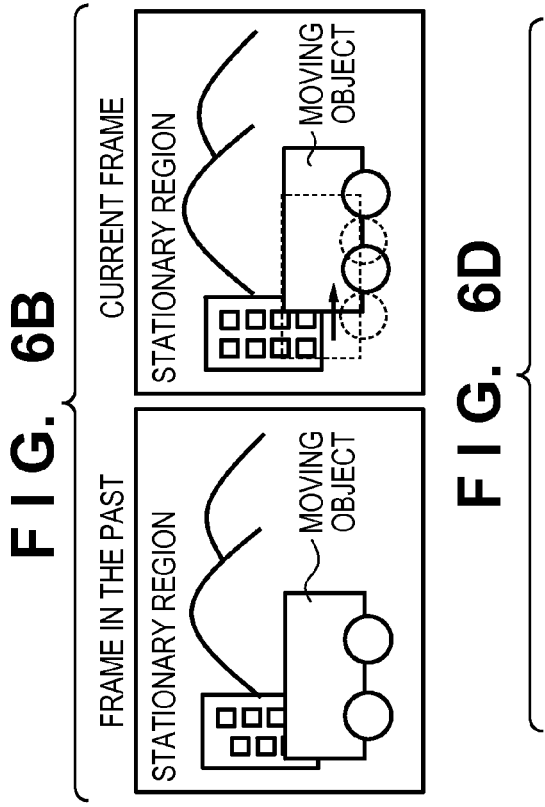
FIG. 6A
FIG. 6B
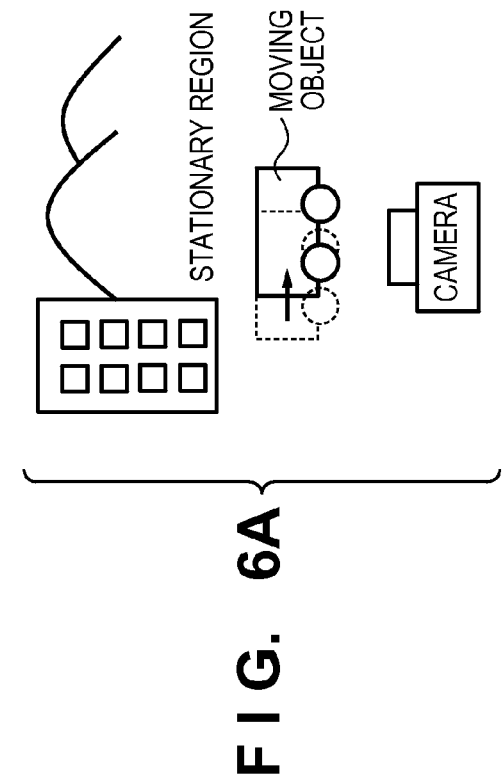
FIG. 6C
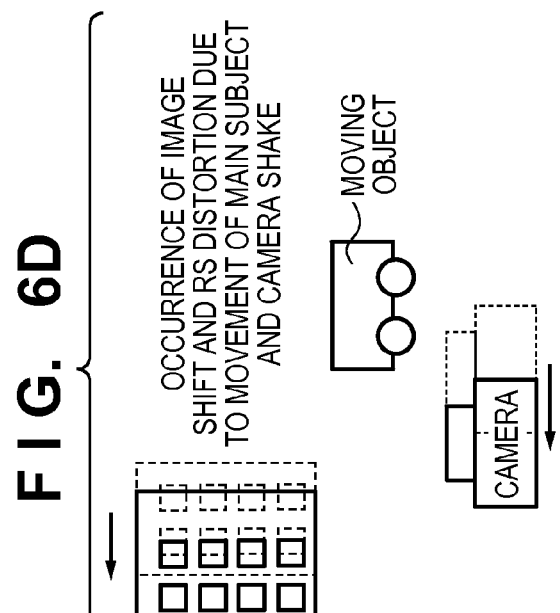
FIG. 6D

RS DISTORTION (YAW)  RS DISTORTION (PITCH)  RS DISTORTION (ROLL)

EXECUTE

NOT EXECUTE

EXECUTE

NOT EXECUTE

IMAGE PROCESSING APPARATUS, IMAGE PROCESSING METHOD, AND STORAGE MEDIUM

BACKGROUND OF THE INVENTION

Field of the Invention

The present invention relates to a technique for achieving optical image stabilization that follows a main subject, thereby correcting an image blur.

Description of the Related Art

In recent years, along with the increase in number of the pixels of cameras and the enhancement of their performance, there has been a growing demand for a more advanced image stabilization function for moving images. For example, Japanese Patent Laid-open No. 2012-14196 proposes an image capturing apparatus that not only suppresses an image blur caused by shake of the image capturing apparatus such as camera shake, but also performs correction of an image blur by causing an optical image stabilization mechanism, which is realized with a lens, an image sensor driving mechanism, etc., to follow the main subject.

Also, Japanese Patent Laid-open No. 2007-215114 proposes not only a gyro sensor that detects only shake of an image capturing apparatus, but also a method for detecting, from an image, a motion vector that can be used for detecting the movement of the image resulting from the relative movements of the image capturing apparatus and the subject, thereby correcting image distortions including a rolling shutter (RS) distortion.

However, if an attempt is made to eliminate a blur of the main subject, the image sway and its accompanying rolling shutter (RS) distortion increase in regions other than the main subject region, such as in the background. In particular, when the subject is a moving object, the sway and the distortion are likely to be noticeable, because the relative movement of the object is greatly different from the relative movement of the background, which is stationary. If the size of a rolling shutter (RS) distortion and the size of a swaying component that cannot be eliminated by the optical image stabilization increase, it is likely that motion sickness is induced by the moving image. Furthermore, if the entire region including non-main subject regions is simply corrected based on the relative movements of the main subject and the camera, image distortions will be more considerable in the regions other than the main subject region that is the target to be followed in the image stabilization by the image capturing apparatus.

SUMMARY OF THE INVENTION

The present invention is made in view of the above-described problems, and, with an image capturing apparatus, effectively suppresses an image blur in regions other than the main subject region, which is amplified when an image blur of the main subject is corrected.

According to a first aspect of the present invention, there is provided an image processing apparatus, comprising: a detection unit configured to detect a main subject from an image captured by an image sensor that captures a subject image; a position detection unit configured to detect a position, on a screen, of the main subject; and a correction unit configured to correct, based on the position of the main subject detected by the detection unit, at least one of a blur and a distortion of an image of a subject other than the main subject, the blur and the distortion occurring due to correction of a blur of an image of the main subject performed by an optical image stabilization unit configured to optically correct a blur, on the screen, of the image of the main subject.

According to a second aspect of the present invention, there is provided an image processing method, comprising: a detection step of detecting a main subject from an image captured by an image sensor that captures a subject image; a position detection step of detecting a position, on a screen, of the main subject; and a correction step of correcting, based on the position of the main subject detected in the detection step, at least one of a blur and a distortion of an image of a subject other than the main subject, the blur and the distortion occurring due to optical correction of a blur, on the screen, of the image of the main subject.

Further features of the present invention will become apparent from the following description of exemplary embodiments with reference to the attached drawings.

BRIEF DESCRIPTION OF THE DRAWINGS

FIG. 2 is a flowchart illustrating the outline of a main subject detection method.

FIGS. 3A to 3C are diagrams illustrating subject region grouping.

FIG. 4 is diagram illustrating a characteristics value calculation for subject region groups.

FIGS. 6A to 6D are diagrams illustrating swaying in non-main subject regions, caused by the image stabilization following the main subject.

DESCRIPTION OF THE EMBODIMENTS

The following provides a detailed description of an embodiment of the present invention, with reference to the accompanying drawings.

Figure 1:
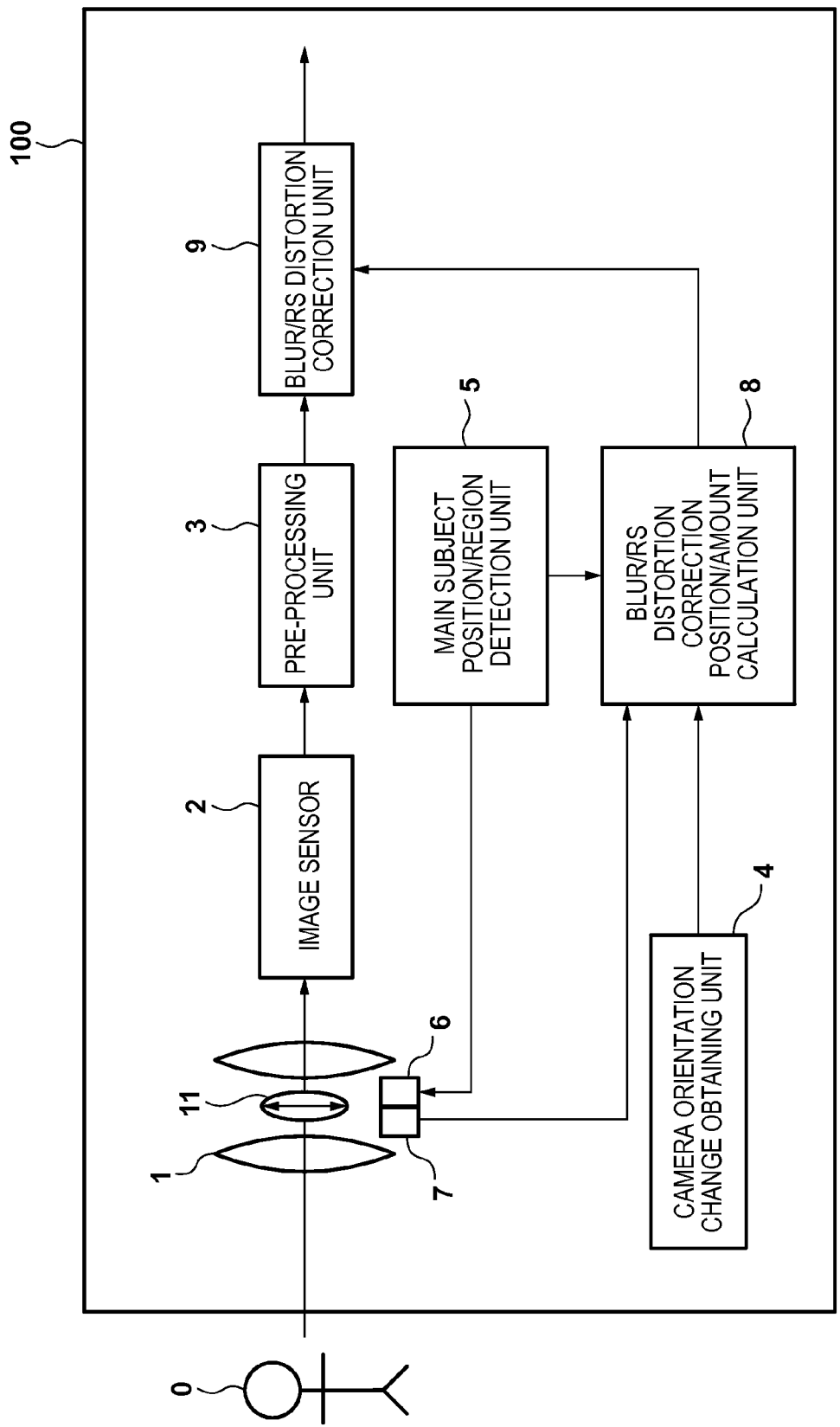
FIG. 1 is a diagram showing a block configuration of an image capturing apparatus according to an embodiment of the present invention.

FIG. 1 is a diagram showing a block configuration of an image capturing apparatus 100 according to an embodiment of the present invention. The image capturing apparatus 100 includes an optical system 1 for forming an image of the subject, an image sensor 2, a pre-processing unit 3, a camera orientation change obtaining unit 4, and a main subject position/region detection unit 5. The image capturing apparatus 100 also includes an optical image stabilization control unit 6, an optical image stabilization control monitoring unit 7, a blur/rolling shutter (RS) distortion correction position/amount calculation unit 8, and a blur/rolling shutter (RS) distortion correction unit 9.

The optical system 1 is a component for forming, on the image sensor 2, an image of light radiated from the subject O, and is composed of a plurality of lenses and a mirror. When the optical system 1 includes an optical image stabilization mechanism, an image blur is corrected by moving a correction lens 11 for image blur correction in a direction that is orthogonal to the optical axis, thereby achieving a parallel shift of the position of the optical image on the image sensor 2.

The image sensor 2 is an element for converting the optical image formed on its sensing surface to an electrical signal. Instead of the correction lens 11 included in the optical system 1, the image sensor 2 may use a piezoelectric element or the like, in order to achieve the parallel shift on the surface that is orthogonal to the optical axis and correct image blurs caused by camera shake.

The pre-processing unit 3 performs, on an analogue image signal resulting from the photoelectric conversion by the image sensor 2, noise reduction by correlated double sampling (CDS) and exposure control by increasing the gain using auto gain control (AGC). The pre-processing unit 3 also performs fundamental processing such as black level correction, A/D conversion, and Bayer arrangement interpolation, and obtains an image signal converted into a digital signal. The pre-processing unit 3 may additionally performs, on the input image to the main subject position/region detection unit 5, color image generation processing or luminance image generation processing by Bayer arrangement interpolation, etc. that is different from processing for output image generation. Such processing may be performed in a simplified manner for detecting the main subject position/region. In addition, in order to improve the accuracy and the robustness of the main subject position/region detection processing, filtering processing such as low-pass or high-pass filtering, and tone adjustment processing such as tone mapping may be performed. Since the pre-processing is mainly performed on analogue signals, the primary component is also referred to as analogue front end (AFE). On the other hand, a component used in a pair with a digital output sensor is referred to as digital front end (DFE).

The camera orientation change obtaining unit 4 includes, for example, a position/orientation sensor such as a gyro or acceleration sensor, or an electronic compass, and measures a variation in the absolute position/orientation within the scene captured by the image capturing apparatus 100. Since distinguishing between a variation in position and a variation in orientation does not have an effect on the spirit of the invention, the description of the present embodiment focuses on a variation in orientation, in order to simplify the description. The orientation sensor is attached to any axis that is orthogonal to the optical axis of the optical system 1. When the orientation sensor is a rotation sensor, it is attached to each of the yaw, pitch, and roll axis of the image capturing apparatus 100, measures the variation in orientation due to rotation about each axis, and provides the information to the blur/rolling shutter (RS) distortion correction position/amount calculation unit 8. Note that the rotation axes that are orthogonal to the optical axis are the yaw axis and the pitch axis, and the rotation axis that is parallel with the optical axis is the roll axis. To improve the performance and accuracy in measuring the position/orientation change, measurement information from an acceleration sensor, a geomagnetic sensor, etc. may be additionally used in the orientation change measurement processing using a rotation sensor signal. Also, the camera orientation change obtaining unit 4 may include therein an integration processing unit, and may output not only orientation change information at a rate according to the sampling timing (1 KHz) of the gyro sensor as the orientation change information sensor for example, but also simultaneously output orientation change information at a different rate according to a sampling timing of 60 fps, 120 fps, etc., i.e., the frame rate of the captured image.

The main subject position/region detection unit 5 receives image information from the pre-processing unit 3, and detects, of the main subject, the presence or absence within an image, the position on the image (position detection), and region information. First, a description is given of the detection of the presence or absence of the main subject within an image, the position of the main subject on the image, and the region information of the main subject, performed in the main subject position/region detection unit 5. Note, however, that various methods have already been proposed for detecting, of the main subject, the presence or absence within an image, the position, and the region information. For example, a method using a variation in intensity and color of an image (see Japanese Patent Laid-open No. 11-190816), a method using distance information (see Japanese Patent Laid-open No. 2007-96437), and a method using a variation in intensity gradient called saliency (Japanese Patent Laid-open No. 2000-207564) have already been proposed. Any method may be employed insofar as the presence or absence within an image, the position, and the region information of the main subject can be detected by the method.

For example, the use of clustering according to the K-means method or EM algorithm based on the information of intensity, depth, etc., and the use of the method of determining the number of segments according to BIC, AIC, etc. (see Beth Horn et al., "Comparison of Segmentation Approaches") can be considered as basic approaches.

Also, the method using the distance information can be easily implemented in an image capturing apparatus, because the AF mechanism of the image capturing apparatus is available. In addition, in the calculation of the region information of the main subject and in the determination of the presence or absence of the main subject, a calculation of advanced multidimensional features such as SIFT features, which constitute a group of local gradient information sets obtained from a pyramid representation of an image, may be secondarily performed, in order to improve the preciseness of the region information and the accuracy of the determination. For example, SIFT features may be aggregated in Bag of Features (BoF) and used as secondary information for improving the preciseness of the region information. Also, multidimensional features such as BoF may be used for the determination of the presence or absence of the main subject, or for determination of the similarity of an image in the main subject region to the main subject, which serves as secondary information for the determination (see A. Rabinovich, et al., "Objects in context", in Proc. of IEEE International Conference on Computer Vision, pp. 1150-1157 (2007)). It is also possible that the user of the image capturing apparatus or the manufacturer of the image capturing apparatus causes a classifier, which employs a neural network, deep learning, a k-ary tree, etc., to learn in advance the multidimensional features extracted from object images as candidates of the main subject. By causing the classifier to search and classify the input multidimensional features extracted from the images, and to calculate the likelihood of similarity to the main subject, any subject that the manufacturer or the user of the image capturing apparatus considers as the main subject can be recognized as the main subject in a flexible manner. Also, when multidimensional features are used as a technology for calculating the region information, a supplemental technology such as Graph Cut may be used, and changes in region information in the time direction may be used for improving the accuracy of the boundary.

The description of the present embodiment is given of an exemplary method based on intensity information, which is the simplest and most basic information, and distance information that can be obtained by using a ranging function such as AF (see Japanese Patent Laid-open No. 11-190816).

FIG. 2 is a flowchart illustrating the outline of a method for detecting, of the main subject, the presence or absence within an image, the position, and the region information.

At Step S101, which is a grouping step, first, as shown in FIG. 3B for example, division processing is performed while a raster scan is being performed from the top left to the bottom right of the screen as indicated by the arrow in the drawing. FIG. 4 is a diagram illustrating the outline of the grouping. FIG. 3A is a color or gray-scale image to be the target. The processing is performed in units of pixels or groups (hereinafter blocks) of local pixels. In this case, by determining whether the block G(x,y−1) and the block G(1−x,y), which are respectively the upper block and the left block of the block of interest G(x,y), belong to a same group or not, it is consequently possible to make the determination as to every adjacent pair of blocks, regarding whether they are same blocks or not. In this regard, the blocks along the top side (Y=0) of the screen and the blocks along the left side (x=0) of the screen are not subjected to the processing, because they do not have upper blocks or left blocks, respectively. The results of the determination are stored at memory G(0,0), . . . , G(m−1,n−1) on the RAM. First, the block G(0,0) is registered with a group number g=1. Then, when a group of a different region is detected, g is incremented by 1 and is considered as the group number of the block. As a result of this processing, each group in the captured scene, shown in FIG. 3A for example, is given a number, as shown in FIG. 3C. This numbering processing is a known technology called "labeling method". The determination as to whether the adjacent blocks are same blocks or not is performed by such a method that blocks are considered as same blocks when the gray levels and/or distance information sets of the adjacent blocks fall within a predetermined range. By the processing described so far, the groups corresponding to a plurality of subjects are detected.

At Step S102, which is a group characteristics value calculation step, characteristics values are calculated, which are for evaluating the characteristics of each of the groups within the image, in other words, each of the groups constituting the captured space. By using the characteristics, the group representing the main subject is determined from among all the groups. For example, the similarity, to the main subject, of the subject region of each group is calculated. This similarity to the main subject is obtained by calculating the characteristics of each group, such as the average distance, width, height, and position on the screen of the region, and the region that can be considered as the main subject is determined by evaluating the characteristics in a comprehensive manner. For example, the following formula is proposed as function S for evaluating the similarity to the main subject.

(Similarity S to the main subject)=(W1* (width)+ W2*(height))/(distance from the center point of the image)+W3*(average distance)  (1)

In the formula above, W1, W2, and W3 are weighting constants, the distance from the center point of the image is the distance from the center of the screen to the center of gravity of the region, and the average distance is the average (subject distance) of the distances of all the blocks within the region. The distance may be calculated for each block by using the AF ranging function, or the value of the AF ranging point included in each group may be used as a representative value. FIG. 4 shows the characteristics values in the form of a map. A subject region that occupies a large area in the image, that is located close to the center point of the image, and that has a small distance has a high score. On the other hand, a subject region that has a small area, that is located close to periphery of the image, and that has a large distance has a low score. The numbers in the drawing show the descending order of the characteristics values.

Step S103, which is a main subject region selection step, is the step at which the group with the highest similarity to the main subject in the last stage is determined to be the main subject, and the region surrounding the blocks belonging to the group is determined to be main subject region information. Also, for example, the position of the center of gravity of the region is determined to be the position information. In the case of FIG. 4, the region labeled with the number 1, which has the highest characteristics value, is selected as the main subject.

Although the present embodiment shows an example case of determining the main subject, the invention is not limited to this example. For example, as described above, a classifier, which employs a neural network, deep learning, a k-ary tree, etc., may be caused to learn in advance the multidimensional features extracted from object images as candidates of the main subject additionally prepared by the user of the image capturing apparatus or the manufacturer of the image capturing apparatus. By causing the classifier to search and classify the input multidimensional features extracted from the images, and to calculate the likelihood of similarity to the main subject, any subject that the manufacturer or the user of the image capturing apparatus considers as the main subject can be recognized and selected as the main subject in a flexible manner.

At Step S104, which is a main subject presence/absence determination step, when the characteristics value indicating the similarity to the main subject is equal to or smaller than a pre-set threshold value, it is determined that no main subject exists in the field of view, and flag information indicating the absence of the main subject is returned as the main subject presence/absence information. When a characteristics value that is sufficiently high is obtained, flag information indicating the presence of the main subject is returned. By these procedures, the presence or absence, position, and region information of the main subject within the image can be obtained.

The optical image stabilization control unit 6 controls the parallel shift of the correction lens 11 for the optical image stabilization, thereby performing image stabilization. When the correction lens 11 is included in the optical system 1, the optical image stabilization control unit 6 controls the parallel shift of the correction lens 11, and when the image sensor 2 itself moves in the direction that is perpendicular to the optical axis, the optical image stabilization control unit 6 controls the parallel shift of the image sensor 2. Based on a variation in the information of the position of the main subject on the image, which is input from the main subject position/region detection unit 5, the correction lens 11 is driven such that, for example, the main subject always remains in the center of the screen, or the main subject is suppressed from considerably varying its position due to the effect of camera shake, subject blur, etc. As a result, the main subject stands still within the captured image frame, and accordingly distortions caused by the movement of the image, such as a rolling shutter (RS) distortion, are suppressed as well.

Figure 5A:
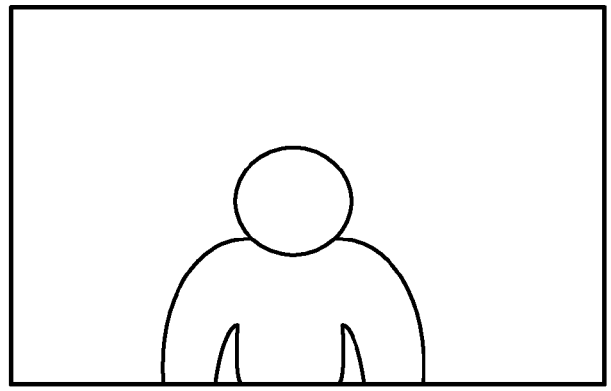
FIGS. 5A to 5C are diagrams illustrating optical image stabilization aimed to follow the main subject.
Figure 5B:
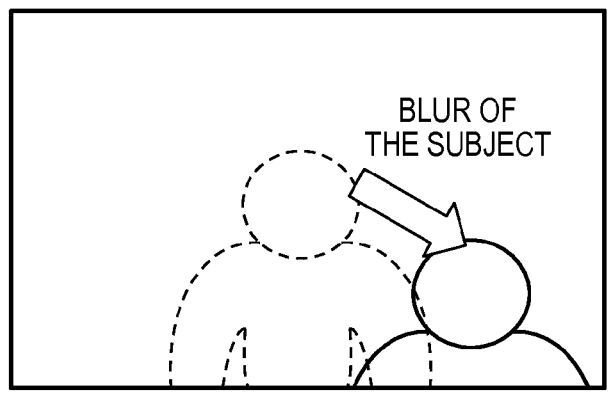
Figure 5C:
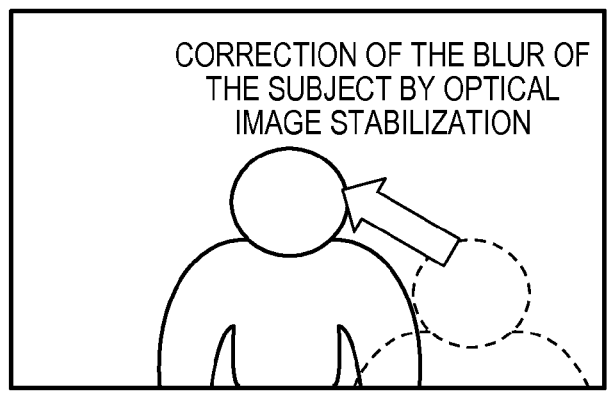

FIGS. 5A to 5C are diagrams illustrating the outline of the image stabilization of the main subject. It is assumed that FIGS. 5A to 5C are image frames at different timings obtained by the image capturing apparatus. It is assumed that the person captured in the center of FIG. 5A is the main subject. As shown in FIG. 5B, when a relative movement occurs between the subject and the image capturing apparatus due to the movement of the image capturing apparatus or the subject, the main subject moves to the corner of the field of view, or to the outside of the field of view in some cases. A technique is proposed for reducing the burden on the viewer by operating the optical image stabilization mechanism to move the main subject to, for example, the center of the field of view, or preventing the main subject from considerably changing its position, e.g., the position of the center of gravity, as shown in FIG. 5C (Japanese Patent Laid-open No. 2012-14196). For example, when the center point of the main subject region is given as the center of gravity, the image stabilization is performed such that the center of gravity of the main subject always stands at the center point of the image.

However, when the main subject is a moving subject, and the background captured in the image, other than the subject, is a still object, the background is shifted in the opposite direction relative to the main subject, and thus camera shake and a distortion due to the camera shake such as the rolling shutter (RS) distortion due to the movement of the image are newly added to the background. FIGS. 6A to 6D show the outline of this phenomenon. FIG. 6A shows the case of a panning shot of a car as the moving subject, in which a building and a mountain in the background are also captured. In the case of a usual image capturing without performing image stabilization of the main subject, as shown in FIG. 6B, an image is obtained in which the car as the moving main subject is moving and the background as the non-main subjects (regions other than the main subject) is stationary. In contrast, when an attempt is made to stop the movement of the car as shown in FIG. 6C, the car will be stationary, but the background moves. In order to simplify the description, the movement of a car is taken above as an example of the relative movement. If the movement of the subject is, for example, a rough up-and-down movement of a car driving on a dirt road, very unpleasant sway will be added to the image. Such a blur or distortion caused by the relative movements of the image capturing apparatus and the subject, when viewed as a moving image, can be a principal cause of motion sickness.

For example, when the focal length converted into the number of pixels of the image output by the pre-processing unit 3 of the optical system 1 is f (pixels), and the positional displacement of the main subject to be corrected is x (pixels) in the horizontal direction, the correction corresponding to the angle calculated by the following formula is made by controlling the optical image stabilization mechanism:

$$\theta Y = \tan^{-1}(x/f) \quad (2)$$

θY denotes the angle by which correction in the yaw direction is made by the optical image stabilization mechanism. Of course, when the displacement is in the vertical direction (e.g., y (pixels)), the correction is made in the pitch direction by angle θp. When the amount to be controlled is the amount (mm) of the parallel shift on the image capturing surface, it is obtained by conversion from the positional displacement x (pixels) on the image, using the focal length f (pixels) and the sensor pitch p (mm), and then control is performed.

$$x \text{ (mm)} = x \text{ (pixels)}/p \text{ (mm/pixels)} \quad (3)$$

The optical image stabilization control monitoring unit 7 is made up from a Hall element or an encoder or the like, and correctly measures the parallel shift amount of the correction lens 11 that performs the optical image stabilization. Alternatively, in the case where the image sensor 2 moves, the optical image stabilization control monitoring unit 7 measures the parallel shift amount of the image sensor 2. The optical image stabilization control monitoring unit 7 may obtain the control information for the optical image stabilization control unit 6 in lieu of it.

The blur/rolling shutter (RS) distortion correction position/amount calculation unit 8 calculates the presence or absence of correction processing on the non-main subject regions, the amount of correction at each position within the image, and the amount of correction to the rolling shutter (RS) distortion, based on the correction amount information from the optical image stabilization control monitoring unit 7, the orientation change information of the image capturing apparatus from the camera orientation change obtaining unit 4, and the information of the positional change of the main subject and the information of the main subject region from the main subject position/region detection unit 5.

Then, the blur/rolling shutter (RS) distortion correction unit 9 performs geometric deformation based on the correction amount for the blur and the rolling shutter (RS) distortion obtained from the blur/rolling shutter (RS) distortion correction position/amount calculation unit 8. The blur/rolling shutter (RS) distortion correction unit 9 then corrects the blur and the rolling shutter (RS) distortion in each image frame, thereby generating an image in which the blur and the distortion, which can be a cause of motion sickness, are suppressed.

First, a description is given of basic issues relating to the calculation of the amount of, and the execution of, correction of the blur and the rolling shutter (RS) distortion in the non-main subject regions. Correction of the blur and the rolling shutter (RS) distortion in the non-main subject regions is basically made on the assumption that the main subject is a stationary subject or a moving subject and all the non-main subject regions are stationary subjects. In other words, when the main subject region is a moving subject, the image blur and the distortion caused by the movement is corrected based on the assumption that the non-main subject region is shifted by the difference between the amount of the movement of the main subject region and the amount of the camera shake that is the target of the conventional blur correction.

Specifically, the amount of correction of the blur and the distortion is determined based on the blur correction amount change information obtained from the optical image stabilization control monitoring unit 7 and the orientation change information obtained from the camera orientation change obtaining unit 4. The blur correction amount change information obtained from the optical image stabilization control monitoring unit 7 corresponds to the amount of the correction actually made in the optical image stabilization for stopping or reducing the positional change of the main subject region. The amount of correction may be calculated independently for each of the horizontal direction and the vertical direction, respectively corresponding to the yaw direction and the pitch direction of the image, which are orthogonal to each other.

When θ_OptStb_X(X:Y,P) denotes the correction angle in the yaw or pitch direction converted into an angle by Formula (2) from the amount of the correction made in the optical image stabilization, and θ_X (X:Y,P) denotes the camera shake angle in the yaw or pitch direction, θ_add_X (X:Y,P), which denotes the amount of the additional shift to the non-main subject regions within the image, can be represented by the following formula:

$$\theta\_add\_X(X:Y,P)=\theta\_OptStb\_X(X:Y,P)-\theta\_X(X:Y,P) \quad (4)$$

It is required to correct the shift corresponding to θ_add_X(X:Y,P) and the rolling shutter (RS) distortion caused by the shift. Therefore, correction of the shift to the non-main subject regions is performed by using the shift correction information and the main subject region information. The shift is corrected by shifting the non-main subject regions in parallel, by the amount equal to the translational movement in the horizontal or vertical direction, which is obtained by the inverse of Formula (2), as shown below:

$$x \text{ or } y = f \tan \theta\_add\_X \quad (5)$$

Meanwhile, for the correction of the rolling shutter (RS) distortion, the blur correction amount change information obtained from the optical image stabilization control monitoring unit 7 and the orientation change information obtained from the camera orientation change obtaining unit 4 are sampled at a higher sampling rate than the frame rate of the image. The distortion correction is performed at high accuracy by calculating in advance the movement corresponding to the scan lines within the screen. For example, the motion information is obtained at a frequency that is equal to or higher than the sampling interval corresponding to the frame rate or the sampling rate for each line of the image.

A method for correcting the rolling shutter (RS) distortion in a video by using an optical correction has already been proposed by the applicant of the present invention, and therefore the method is described here only briefly.

The following is a phenomenological expression of the course of development of a rolling shutter (RS) distortion (see S. Baker, R. Szeliski, et al., "Removing Rolling Shutter Wobble", Proc. CVPR (2010), p.p. 2392-2399):

$$\vec{x}'=\vec{x}+\int_{t_1}^{t} m(\vec{x}; \vec{p}(s))ds, \text{ where } t=y'\tau \approx y\tau, t_1=y_1\tau \quad (6)$$

In the following, $\vec{x}$, $\vec{x}'$, and $\vec{p}(t)$ are respectively represented as x→, x'→, and p→.

x'→ denotes a rolling shutter (RS) distortion image coordinate, x→ denotes an image coordinate after the rolling shutter distortion correction, and m( ) denotes a spatial movement model function. The second term on the right-hand side is a term that reproduces the movement on the image due to the movement of the image capturing apparatus occurring during the period (y-yl) τ, which is the gap between the exposure period for the reference line y and the exposure period for the line y that includes the target pixels of the geometric deformation. t1 denotes the capturing time of the reference line, and t denotes the capturing time of the line including the correction target pixels. p→(t) denotes a vector quantity representing a motion information parameter.

Furthermore, when the information that can be obtained is the changes of the orientation of the camera in the yaw, pitch, and roll directions, the formula can be simplified, i.e., the function m( ) can be taken out of the integration.

$$\vec{x}=\vec{x}'-m(\vec{x};\int_{t_1}^{t'} \vec{p}(s)ds) \quad (6')$$

Also, regarding the yaw, pitch, and roll directions for example, m(θ) can be represented as f tan θ in this case. Therefore, the formula for correction with respect to pixels of each line can be developed in the following form:

$$\vec{x}=\vec{x}'(,1)-(f\tan(\int_{t_1}^{t'}\theta_Y(s)ds),-f\tan(\int_{t_1}^{t'}\theta_{P(s)ds}))^T \quad (7)$$

x→(,1) represents that the formula is for correction of a given pixel on the distorted image in the horizontal coordinate system, with the image height 1. It is shown that the correction parameter quantity is the same for each line. Based on such interpretation and approximation of the phenomenological expression, the amount of correction made to the rolling shutter (RS) distortion in each line within the frame can be obtained by integration with reference to the line y1 with the image height including the reference coordinates determined by a geometric deformation reference coordinates determination unit.

Also, in order to subtract the influence of the optical image stabilization, the change rate Δshx(1) of the parallel shift for optical image stabilization of each line of each frame, calculated by the optical image stabilization control monitoring unit 7, is subtracted from Formula (7) of the yaw, pitch, and roll directions. The amount of correction represented by the following formula can be obtained:

$$\vec{x}=\vec{x}'(,1)-((\int_{t_1}^{t'}f\tan\theta_Y(s)-\Delta sh_Y(s)ds),-(\int_{t}^{t'1\ ftan}\theta_P(s)-\Delta sh_{P(s)ds}))^T \quad (8)$$

Based on the mapping formula above, integration is performed by using, as variables of integration, the change of the orientation until the line corresponding to each line of the video with reference to the line y1 with the image height including the reference coordinates, and the change of the translational movement due to the optical image stabilization. Then, the integral of the correction amount is calculated for each of the roll, pitch, and yaw, and is sent to the blur/rolling shutter (RS) distortion correction unit 9.

$$\Delta X(l)=\int_{t_1}^{t'}f\tan\theta_Y(s)-\Delta sh_Y(s)ds$$

$$\Delta P(l)=\int_{t_1}^{t'}f\tan\theta_P(s)-\Delta sh_P(s)ds$$

$$\Delta\Theta(l)=\int_{t_1}^{t'}\theta_R(s)ds \quad (9)$$

However, when backward mapping is desired to be performed, it is necessary to map the data arrays of ΔX, ΔP, and ΔΘ and reconstruct the parameter, based on the parameter of ΔP(l). So far, a description has been given of correction of the rolling shutter (RS) distortion, taking general camera shake as an example. In the case of correction of a blur in the main subject, the reversed sign is attached to the amount of correction, because the optical image stabilization applied to the non-main subject region causes the effect of shifting in the yaw and pitch directions.

$$\Delta X(l)=-\int_{t_1}^{t'1\ f\ \tan\theta}Y(s)-\Delta sh_Y(s)ds$$

$$\Delta P(l)=-\int_{t_1}^{t'1\ f\ \tan\theta}P(s)-\Delta sh_P(s)ds \quad (9')$$

Figure 7:
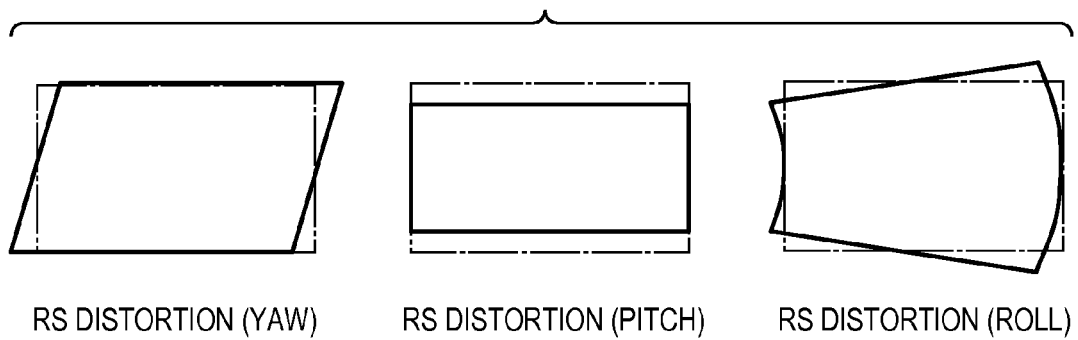
FIG. 7 is a diagram illustrating a distortion that is a target of rolling shutter (RS) distortion correction.

This processing corrects the distortion due to the rolling shutter effect in the non-main subject region, which is caused by the optical image stabilization in the yaw and pitch directions as shown in FIG. 7. The rolling shutter (RS) distortion in the roll direction caused by camera shake may also be corrected at the same time.

Figure 8:
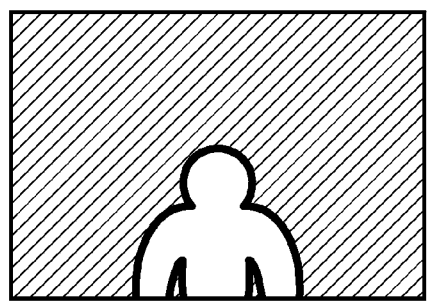
FIG. 8 is a diagram illustrating sway/distortion correction involving selection of a non-main subject region.

Also, as shown in FIG. 8, a mask is applied to the main subject region to form a non-application region, and the correction is applied to the entire non-main subject region, or to a selected region. In the drawing, the shaded portion is the application area of the processing, and the white region is the non-application region.

The blur/rolling shutter (RS) distortion correction unit 9 corrects the blur and the rolling shutter (RS) distortion in the non-main subject region, based on the main subject region information obtained by the main subject position/region detection unit 5 and the correction amount obtained by the blur/rolling shutter (RS) distortion correction position/amount calculation unit 8. The blur/rolling shutter (RS) distortion correction unit 9 receives blur correction parameters Y(j), P(j), and R(j) and rolling shutter (RS) correction parameters $\Delta X$, $\Delta P$, and $\Delta \Theta$, obtains corrected frames by performing a conversion for each of the frames, thereby generating a video.

Figure 9B:
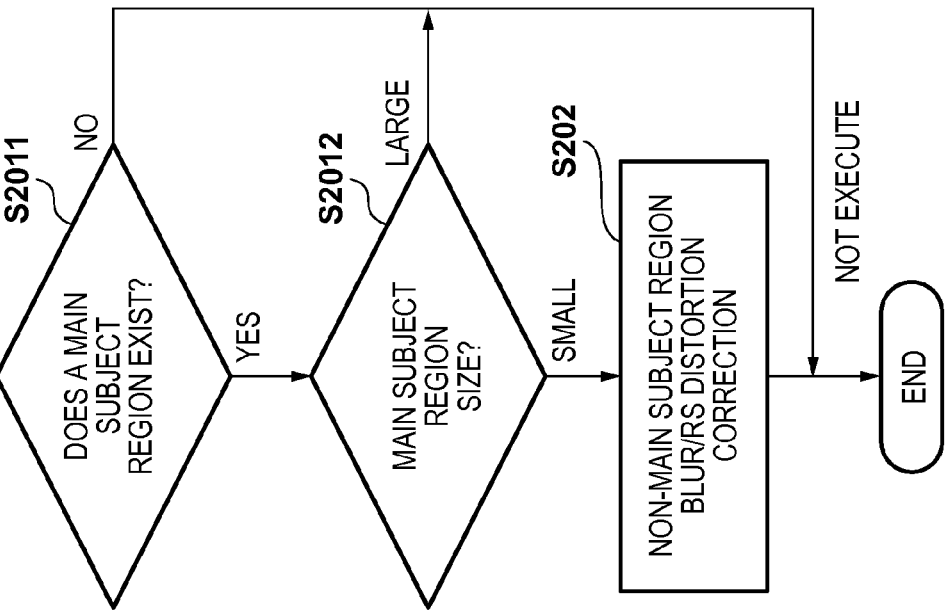
FIGS. 9A to 9C are diagrams illustrating processing flows of distortion/blur correction position/amount calculation.
Figure 9A:
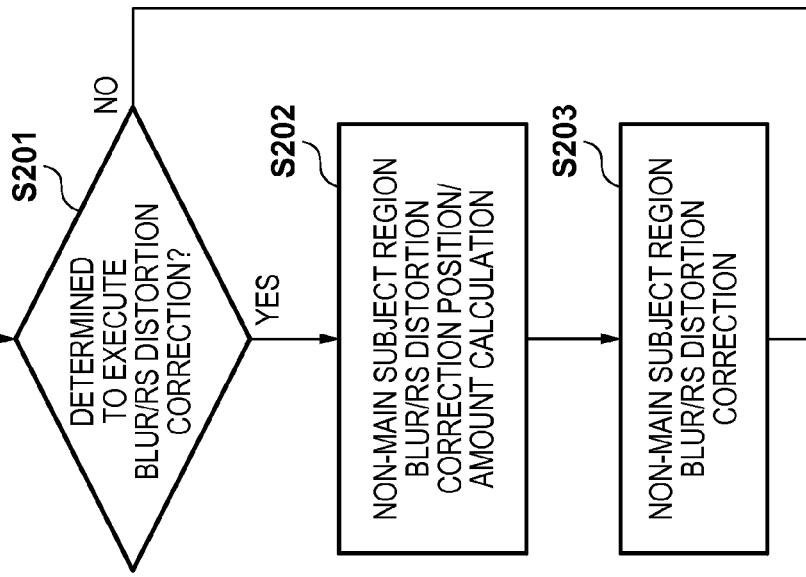
Figure 9C:
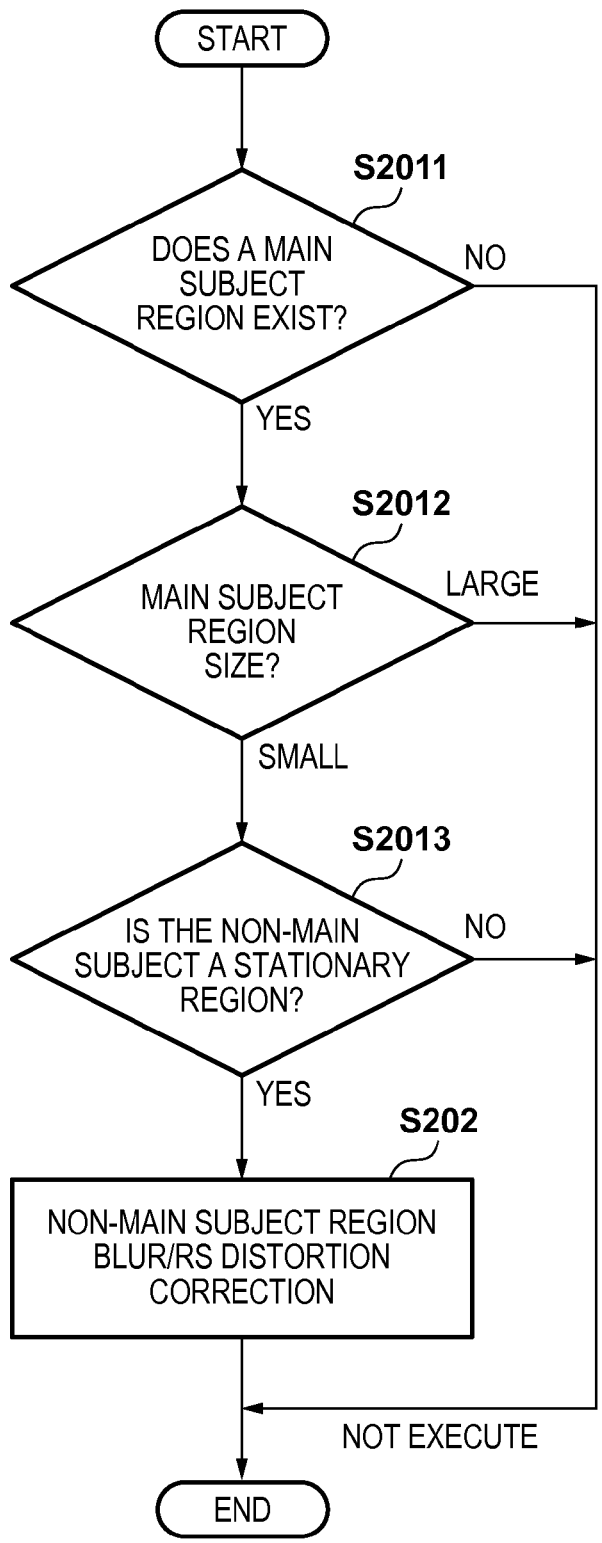

FIGS. 9A to 9C show schematic processing flows for calculating the distortion/blur correction position/amount. As shown in FIG. 9A, the processing can be roughly divided into Step S201, which is an execution determination step, Step S202, which is a non-main subject region blur/rolling shutter (RS) distortion correction position/amount calculation step, and Step S203, which is a non-main subject region blur/rolling shutter (RS) distortion correction step.

First, a description is given of Step S202, which is a non-main subject region blur/rolling shutter (RS) distortion correction position/amount calculation step, and of Step S203, which is a non-main subject region blur/rolling shutter (RS) distortion correction step.

Figure 10A:
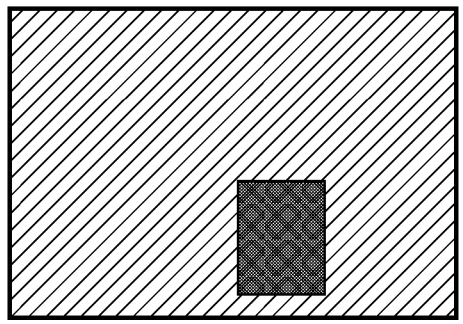
FIGS. 10A and 10B are diagrams illustrating the outline of determination as to whether to execute correction processing, in relation to a main subject region size.
Figure 10B:
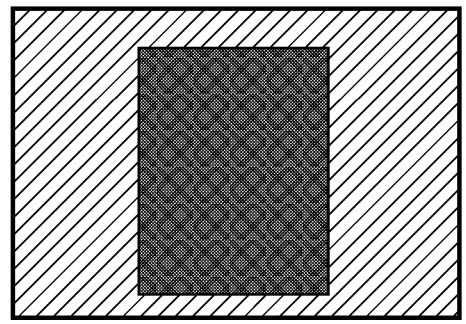

It is possible that the blur correction and the rolling shutter (RS) distortion correction in the non-main subject region are not performed, depending on whether or not the main subject exists, the proportion of the region within the image, and the movement of the non-main subject region. Specifically, as shown in the flowchart of FIG. 9B, when the proportion (ratio) in size of the main subject region to the image is large, the correction processing for the non-main subject region is not performed. FIG. 10A and FIG. 10B show the difference between the case of performing the correction processing in the non-main subject region and the case of not performing it. As shown in FIG. 10A, when the main subject region is small and the proportion of the non-main subject region is large, the correction processing is performed, because the size of the blur and the size of the rolling shutter (RS) distortion caused by the blur are large and there is the possibility that motion sickness will be caused. In contrast, as shown in FIG. 10B, when the main subject region is large and the proportion of the non-main subject region is small, the correction processing is not performed, because the effect of the correction will be small.

Figure 11A:
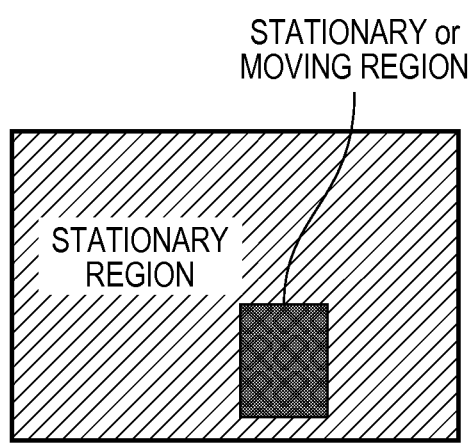
FIGS. 11A and 11B are diagrams illustrating the outline of determination as to whether to execute correction processing, in relation to a non-main subject region movement.
Figure 11B:
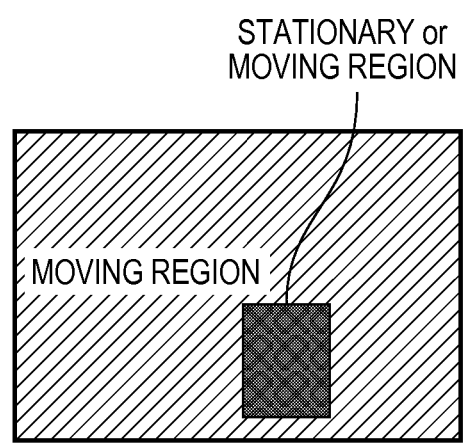

The correction according to the present embodiment is performed on the assumption that the non-main subject region is a stationary region. Whether or not to perform the correction processing in the non-main subject region may be determined with additional reference to the movement of the non-main subject region, as shown in the flowchart of FIG. 9C. Specifically, using a motion vector search unit, which is not shown in the drawings, the image movement in each group region within the image is calculated. The non-main subject region is considered as a stationary region as shown in FIG. 11A when the movement is equal to the movement obtained by subtracting the orientation change information of the image capturing apparatus, which is obtained by the camera orientation change obtaining unit 4, from the change between frames in amount of correction performed in the optical stabilization, which is represented by Formula (4). Then, the blur/rolling shutter (RS) distortion correction processing is performed. In contrast, when they are significantly different, the non-main subject region is considered as a moving region as shown in FIG. 11B, and the processing is not performed. Determination as to whether the region is a stationary region or not may be performed on the entire non-main subject region at a time, or performed for each group region.

Figure 12A:
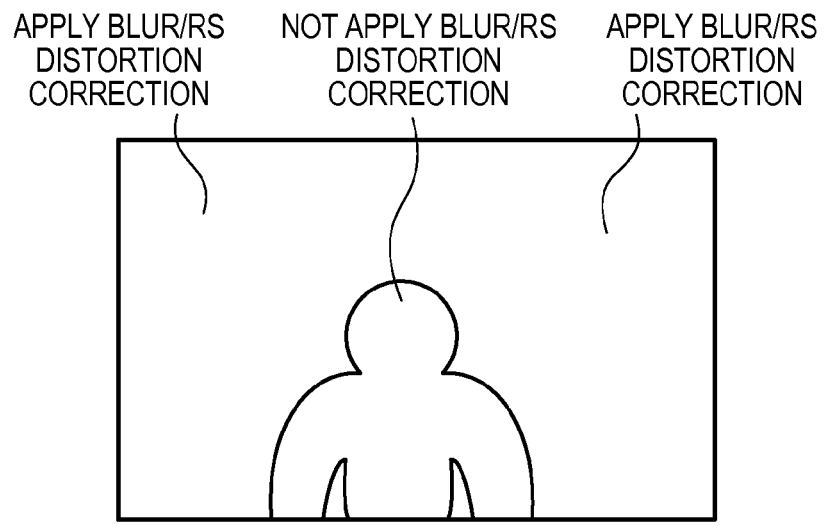
FIGS. 12A to 12C are diagrams illustrating processing for suppressing the occurrence of an occlusion region.
Figure 12B:
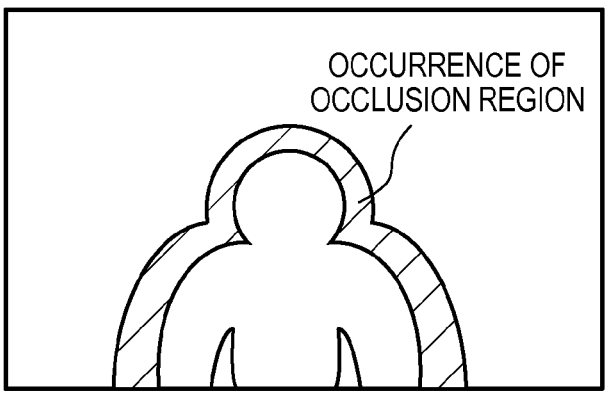

However, if the blur correction or the rolling shutter (RS) distortion correction is simply performed only on the non-main subject region as shown in FIG. 12A, misalignment occurs at the boundary with the main subject region that is not corrected, as shown in FIG. 12B. To address this adverse effect, if interpolation is performed in the region closer to the image capturing apparatus, the image will have an unnatural appearance. In this case, natural interpolation can be achieved by performing the interpolation in a region on the background side that is adjacent to the occlusion, based on the distance information obtained by the above-described AF or the like.

Figure 12C:
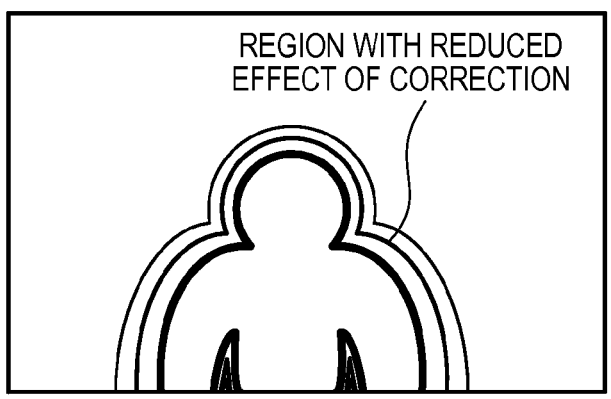

Alternatively, it is effective to form multiple layers of sub regions by, in a morphological manner, expanding the main subject region information obtained as shown in FIG. 12C in the direction that is orthogonal to the boundary, and continuously reduce the amount of the blur correction and the amount of the rolling shutter (RS) distortion correction for each of the regions.

The image information that has undergone the blur/rolling shutter (RS) distortion correction is then transmitted to, for example, a post-processing unit, which is not shown in the drawings, and is converted to image data that meets the purpose, and is stored. For example, the pre-processing unit is configured to perform back end image processing on the input digital image signal, such as linearization matrix processing, white balance adjustment, YCC conversion, color difference/gray level/contrast correction, and edge enhancement. The back end processing is called digital back end (DBE) processing in contrast with the AFE processing performed by the pre-processing unit 3. A single output image can be generated by performing the front end processing and the back end processing. Furthermore, in recent years, processing for improving the additional value is also categorized as a type of post-processing, which includes, for example, high dynamic range (HDR) expansion for generating an image with a higher dynamic range by combining a plurality of images that have undergone registration, multiple image noise reduction (NR), and super-resolution processing, which use the motion vector obtained by the motion vector search unit not shown in the drawings. By such processing, information of an output image formed as a single image or a moving image is generated. Also, motion blur information is used as image meta information or separately-managed information, which serves as supplemental image information, and may be used for achieving an additional function such as three-dimensional reconstruction, space mapping, recognition, etc.

The image information that has undergone the blur/rolling shutter (RS) distortion correction, or the image information processed by the post-processing unit is temporarily stored in a work memory made up of a DRAM or the like, not shown in the drawings, or is transmitted directly to a possible additional post-stage processing unit. Examples of the post-stage processing unit include an encoding unit that performs conversion to a given format for saving, a recording unit made up of a semiconductor memory or the like, a display unit made up of, for example, a display such as a liquid crystal display, and an external input output I/F made up of an I/F (interface) to which, for example, a wireless LAN, a wired LAN, a cable such as a USB cable can be connected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-159766, filed Aug. 5, 2014, which is hereby incorporated by reference herein in its entirety.

What is claimed is:

1. An image processing apparatus, comprising:
a detection unit configured to detect a main subject from an image captured by an image sensor that captures a subject image;
a position detection unit configured to detect a position, on a screen, of the main subject; and
a correction unit configured to correct, based on the position of the main subject detected by the detection unit, at least one of a blur and a distortion of an image of a subject other than the main subject, the blur and the distortion occurring due to correction of a blur of an image of the main subject performed by an optical image stabilization unit configured to optically correct a blur, on the screen, of the image of the main subject.

2. The image processing apparatus according to claim 1, wherein the optical image stabilization unit is a shake correction lens provided in an imaging optical system.

3. The image processing apparatus according to claim 1, wherein the optical image stabilization unit is a driving unit configured to move the image sensor in a direction that is different from an optical axis direction.

4. The image processing apparatus according to claim 1, wherein the correction unit corrects at least one of a blur and a distortion of an image of a subject other than the main subject by applying a geometric deformation to the image.

5. The image processing apparatus according to claim 1, wherein the detection unit detects the main subject based on at least one of a gray level of an image, a color, a subject distance, a size of a subject on the screen, and a position of a subject.

6. The image processing apparatus according to claim 1, wherein, when a proportion in size of the main subject to the screen is equal to or less than a predetermined value, the correction unit corrects at least one of the blur and the distortion of the image of the subject other than the main subject, and when the proportion in size of the main subject to the screen is greater than the predetermined value, the correction unit does not correct the blur or the distortion of the image of the subject other than the main subject.

7. The image processing apparatus according to claim 1, wherein, when the subject other than the main subject is a stationary subject, the correction unit corrects at least one of the blur and the distortion of the image of the subject other than the main subject, and when the subject other than the main subject is a moving subject, the correction unit does not correct the blur or the distortion of the image of the subject other than the main subject.

8. The image processing apparatus according to claim 1, further comprising a shake detection unit configured to detect shake of the image processing apparatus.

9. The image processing apparatus according to claim 1, wherein, at a boundary between a region of the main subject and a region of the subject other than the main subject, a correction amount for correcting at least one of the blur and the distortion of the image of the subject other than the main subject is continuously reduced in a direction from the region of the subject other than the main subject to the region of the main subject.

10. An image processing method, comprising:
a detection step of detecting a main subject from an image captured by an image sensor that captures a subject image;
a position detection step of detecting a position, on a screen, of the main subject; and
a correction step of correcting, based on the position of the main subject detected in the detection step, at least one of a blur and a distortion of an image of a subject other than the main subject, the blur and the distortion occurring due to optical correction of a blur, on the screen, of the image of the main subject.

11. A non-transitory computer-readable storage medium storing therein a program for causing a computer to perform an image processing method comprising:
a detection step of detecting a main subject from an image captured by an image sensor that captures a subject image;
a position detection step of detecting a position, on a screen, of the main subject; and a correction step of correcting, based on the position of the main subject detected in the detection step, at least one of a blur and a distortion of an image of a subject other than the main subject, the blur and the distortion occurring due to optical correction of a blur, on the screen, of the image of the main subject.

* * * * *